(12) United States Patent
Fujiwara et al.

(10) Patent No.: US 8,247,108 B2
(45) Date of Patent: Aug. 21, 2012

(54) ALKALINE PRIMARY BATTERY COMPRISING A SEALING AGENT

(75) Inventors: Michiko Fujiwara, Osaka (JP); Seiji Wada, Osaka (JP); Yasushi Sumihiro, Hyogo (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 12/296,463

(22) PCT Filed: Sep. 27, 2007

(86) PCT No.: PCT/JP2007/068824
§ 371 (c)(1),
(2), (4) Date: Oct. 8, 2008

(87) PCT Pub. No.: WO2008/044480
PCT Pub. Date: Apr. 17, 2008

(65) Prior Publication Data
US 2009/0123824 A1    May 14, 2009

(30) Foreign Application Priority Data
Oct. 11, 2006   (JP) .................................. 2006-277575

(51) Int. Cl.
*H01M 2/14* (2006.01)
*H01M 2/08* (2006.01)
(52) U.S. Cl. ........................................ 429/129; 429/185
(58) Field of Classification Search .................. 429/129, 429/185
See application file for complete search history.

(56) References Cited

U.S. PATENT DOCUMENTS

| | | | |
|---|---|---|---|
| 6,703,157 B1 * | 3/2004 | Shoji et al. ...................... | 429/56 |
| 2003/0104275 A1 * | 6/2003 | Ishida et al. ................... | 429/174 |
| 2004/0122161 A1 | 6/2004 | Paul et al. | |
| 2005/0063893 A1 * | 3/2005 | Ayala et al. ................ | 423/449.1 |
| 2005/0271942 A1 | 12/2005 | Izumi et al. | |
| 2007/0135563 A1 | 6/2007 | Summons et al. | |

FOREIGN PATENT DOCUMENTS
JP        57-163962        10/1982
(Continued)

OTHER PUBLICATIONS

ChemYQ.com, C9 Petroluem resin, 2005.*
(Continued)

*Primary Examiner* — Karie O'Neill Apicella
(74) *Attorney, Agent, or Firm* — McDermott Will & Emery LLP

(57) ABSTRACT

An alkaline primary battery of the present invention includes a positive electrode containing at least one of manganese dioxide and nickel oxyhydroxide; a negative electrode containing zinc; a separator disposed between the positive electrode and the negative electrode; an alkaline electrolyte; a battery case for housing the positive electrode, the negative electrode, the separator, and the alkaline electrolyte; a sealing plate for sealing the opening portion of the battery case; a resin-made gasket disposed between the battery case and the sealing plate; and a negative electrode current collector inserted in the negative electrode and the gasket. Between the battery case and the gasket, a sealing agent is applied. The sealing agent includes a mixture of a hot-melt resin with a weight average molecular weight of 1000 to 3000 and a softening point of 95 to 160° C.; and polybutene with a number average molecular weight of 300 to 700 and a kinematic viscosity at 40° C. of 10 to 1000 mm²/S.

6 Claims, 1 Drawing Sheet

FOREIGN PATENT DOCUMENTS

| | | |
|---|---|---|
| JP | 62-154555 | 7/1987 |
| JP | 63-21743 | 1/1988 |
| JP | 7-122248 | 5/1995 |
| JP | 2575986 | 4/1998 |
| JP | 2000-507283 | 6/2000 |
| JP | 2001-015094 | 1/2001 |
| JP | 2004-204231 | 7/2004 |
| JP | 2004-311069 | 11/2004 |
| JP | 2005-353308 | 12/2005 |
| JP | 2006-19178 | 1/2006 |
| WO | WO 2006/004033 A1 | 1/2006 |

OTHER PUBLICATIONS

Japanese Office Action issued in Japanese Patent Application No. JP 2006-277575 dated Apr. 26, 2012.

European Search Report issued in Application No. 07828570.7 issued on Feb. 8, 2012.

* cited by examiner

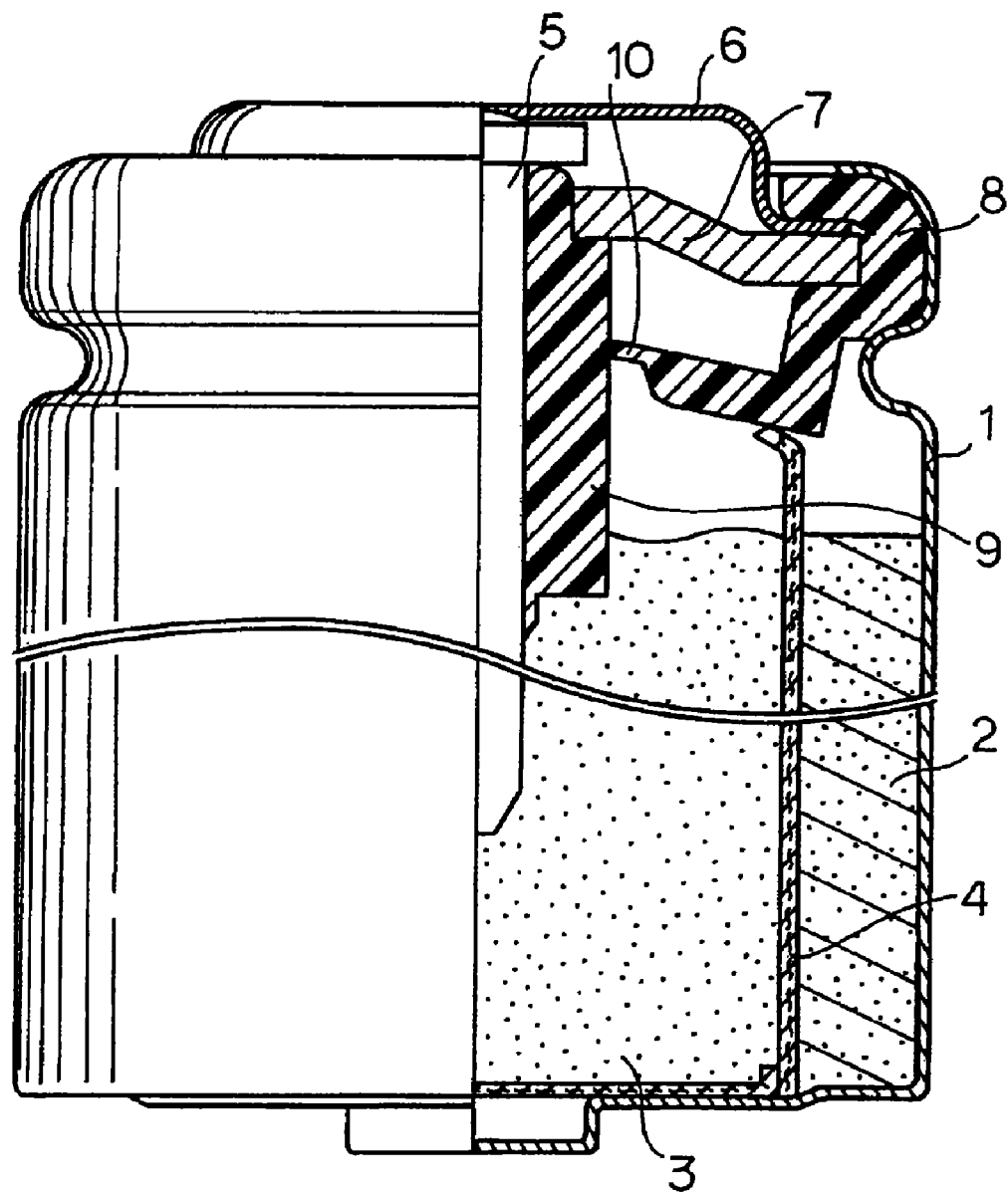

ALKALINE PRIMARY BATTERY COMPRISING A SEALING AGENT

RELATED APPLICATIONS

This application is the U.S. National Phase under 35 U.S.C. §371 of International Application No. PCT/JP2007/068824, filed on Sep. 27, 2007, which in turn claims the benefit of Japanese Application No. 2006-277575, filed on Oct. 11, 2006, the disclosures of which Applications are incorporated by reference herein.

TECHNICAL FIELD

The present invention relates to alkaline primary batteries, particularly to a sealing agent which is applied to a seal portion between a battery case and a resin-made gasket.

BACKGROUND ART

Conventionally, in alkaline primary batteries, a sealing agent is applied to a seal portion, i.e., between the battery case and the gasket disposed at the opening portion of the battery case, to improve leakage-resistance. The leakage in alkaline primary batteries is caused by creeping of the alkaline electrolyte, or by hydrogen gas generation under over-discharge or self-discharge.

Various examinations have been conducted on such a sealing agent to improve the leakage-resistance. For example, Patent Document 1 has proposed forming a coating of a sealing agent by applying and drying a sealing agent comprising asphalt, polybutene, and an organic solvent to the seal portion of alkaline primary batteries, and afterwards, heating to soften and melt the asphalt. Patent Document 2 has proposed applying a sealing agent containing polybutene to the seal portion of manganese dry cell batteries.

Patent Document 3 has proposed dissolving a sealing material containing polybutene in an organic solvent, and applying it to the seal portion of alkaline batteries. Patent Document 4 has proposed a sealing agent containing an aromatic hydrocarbon and polybutene with an average molecular weight of 700 to 10000 in a ratio of 10:90 to 80:20. In the field of fuel cells, a sealing agent using a hot-melt resin has been developed for preventing gas leakage.

However, the asphalt contained in the sealing agent of Patent Document 1 is solid at room temperature, and to form a uniform coating of a sealing agent at the seal portion with polybutene mixed therein, the asphalt has to be dissolved in a highly volatile organic solvent for the application to the seal portion. In Patent Document 3 as well, an organic solvent is used for uniformly applying the sealing agent to the seal portion, and probably this is also a highly volatile organic solvent which is easily dried. Highly volatile organic solvents are harmful to environment and human body, and have been a subject of legal restrictions in Europe nowadays. The highly volatile organic solvent mentioned herein refers to an organic solvent with a vapor pressure at 20° C. of 10 Pa or more.

On the other hand, polybutene contained in the sealing agent in Patent Document 1 is liquid at room temperature and has high flowability, and therefore it is difficult to be applied uniformly to the seal portion. Also, with repetitive rapid temperature changes, sometimes it flows out from the seal portion.

Further, the sealing agent of Patent Document 4 comprises a mixture of polybutene with a molecular weight of 700 to 10000, and a liquid-state aromatic hydrocarbon with a relatively low viscosity at room temperature. The mixture is excellent in flowability and application performance. However, since this sealing agent is liquid at room temperature, the sealing agent is not sufficiently dried, and with repetitive rapid temperature changes, the sealing agent sometimes flows out from the seal portion of the battery.

In the case when the above hot-melt resin is singly used as the sealing agent, unless the temperature is significantly raised for application, the flowability necessary for the application cannot be obtained sufficiently, and therefore uniform application is difficult. Additionally, since it completely solidifies after it is applied and dried, with repetitive rapid temperature changes, the battery case and gasket undergo expansion and contraction, which create gaps between the coating, and the battery case and the gasket, easily reducing sealing performance. Further, when the sealing agent is rubber, the sealing performance easily declines at low temperature.

[Patent Document 1] Japanese Laid-Open Patent Publication No. Sho 57-163962
[Patent Document 2] Utility Model Registration No. 2575986
[Patent Document 3] Japanese Laid-Open Patent Publication No. 2004-311069
[Patent Document 4] Japanese Laid-Open Patent Publication No. 2006-19178

DISCLOSURE OF THE INVENTION

Problem to be Solved by the Invention

Thus, to solve the above conventional problems, the present invention aims to provide an alkaline primary battery with excellent sealing performance even under rapid temperature change, by using a sealing agent which does not contain a highly volatile organic solvent.

Means for Solving the Problem

The present invention provides an alkaline primary battery comprising:

a positive electrode containing at least one of manganese dioxide and nickel oxyhydroxide;

a negative electrode containing zinc;

a separator interposed between the positive electrode and the negative electrode;

an alkaline electrolyte;

a battery case for housing the positive electrode, the negative electrode, the separator, and the alkaline electrolyte;

a sealing plate for sealing an opening portion of the battery case;

a resin-made gasket disposed between the battery case and the sealing plate; and a negative electrode current collector inserted in the negative electrode and the gasket, wherein a sealing agent is applied between the battery case and the gasket, the sealing agent comprising a mixture of a hot-melt resin with a weight average molecular weight of 1000 to 3000 and a softening point of 95 to 160° C., and polybutene with a number average molecular weight of 300 to 700 and a kinematic viscosity at 40° C. of 10 to 1000 mm$^2$/S.

The hot-melt resin preferably includes a copolymer of vinyltoluene and indene.

The mixing weight ratio of the hot-melt resin to the polybutene in the sealing agent is preferably 20 to 60:80 to 40.

The sealing agent further preferably contains 0.001 to 5 wt % of a coloring agent.

The sealing agent further preferably contains 0.001 to 0.5 wt % of an antioxidant.

EFFECT OF THE INVENTION

Based on the present invention, an alkaline primary battery which keeps excellent sealing performance even under rapid temperature change can be obtained.

Additionally, since the sealing agent used in the alkaline primary battery of the present invention achieves a uniform coating just by applying it to the seal portion, a step for adding a highly volatile organic solvent to the sealing agent and a step for volatilizing the organic solvent and drying the sealing agent, which have been necessary in conventional sealing agent, are unnecessary. Thus, production efficiency improves and a low-cost alkaline primary battery can be obtained.

As described above, since a highly volatile organic solvent is not necessary for the sealing agent, environmental loads can be decreased.

Since the sealing agent includes a hot-melt resin, a dried-state necessary for securing the excellent sealing performance can be easily attained for a short period of time at the seal portion.

BRIEF DESCRIPTION OF THE DRAWING

FIG. 1 A front view of an alkaline primary battery in an Example of the present invention, with a partial cross section.

BEST MODE FOR CARRYING OUT THE INVENTION

An alkaline primary battery of the present invention comprises:

a positive electrode containing at least one of manganese dioxide and nickel oxyhydroxide;

a negative electrode containing zinc;

a separator interposed between the positive electrode and the negative electrode;

an alkaline electrolyte;

a battery case for housing the positive electrode, the negative electrode, the separator, and the alkaline electrolyte;

a sealing plate for sealing an opening portion of the battery case;

a resin-made gasket disposed between the battery case and the sealing plate; and a negative electrode current collector inserted in the negative electrode and the gasket, wherein a sealing agent is applied between the battery case and the gasket, the sealing agent comprising a mixture of a hot-melt resin with a weight average molecular weight of 1000 to 3000 and a softening point of 95 to 160° C., and polybutene with a number average molecular weight of 300 to 700 and a kinematic viscosity at 40° C. of 10 to 1000 mm$^2$/S.

Based on the above configuration, even under rapid temperature change, the sealing agent can keep excellent application performance, and therefore an alkaline primary battery with excellent sealing performance can be obtained.

Also, since the sealing agent used in the alkaline primary battery of the present invention achieves a uniform coating just by applying it to the seal portion, a step for adding a highly volatile organic solvent to the sealing agent and a step for volatilizing the organic solvent and drying the sealing agent, which have been necessary in conventional sealing agents, are unnecessary. Thus, production efficiency improves and a low-cost alkaline primary battery can be obtained.

As described above, since a highly volatile organic solvent is not necessary for the sealing agent, environmental loads can be reduced. Since the sealing agent includes a hot-melt resin, a dried-state necessary for securing the excellent sealing performance can be easily attained for a short period of time at the seal portion.

Hot-melt resins are nonvolatile resins, which are solid under ambient temperature; have thermoplasticity and adhesiveness; and contain no water and solvent.

With the hot-melt resin having a weight average molecular weight of below 1000 and a softening point of below 95° C., the sealing agent's viscosity becomes low and its flowability increases, thereby making it difficult to keep the sealing agent at the seal portion. On the other hand, with the hot-melt resin having a weight average molecular weight of over 3000 and a softening point of over 160° C., the viscosity of the sealing agent becomes excessively high, thereby making it difficult to uniformly apply the sealing agent at the seal portion.

The weight average molecular weight can be determined, for example, by using the GPC method (Gel Permeation Chromatography). The softening point can be determined for example by the ring-and-ball method specified in JIS K2207.

The hot-melt resin comprises, for example, a petroleum resin which is mainly composed of a copolymer of an aromatic hydrocarbon with eight to ten carbons derived from petroleum naphtha. The above copolymer is preferably a copolymer of vinyltoluene and indene.

Indene is an unstable material and easily copolymerized with another monomer. When the indene content is high, the softening point becomes high even with the same molecular weight. Also, a higher average molecular weight renders the softening point higher. The softening point of the hot-melt resin can be changed by appropriately adjusting the indene content and the average molecular weight.

When the number average molecular weight of polybutene is below 300 and the kinematic viscosity at 40° C. is below 10 mm$^2$/S, the sealing agent's viscosity becomes low and its flowability increases, thereby making it difficult to keep the sealing agent at the seal portion. When the number average molecular weight of polybutene exceeds 700 and the kinematic viscosity at 40° C. exceeds 1000 mm$^2$/S, the viscosity of the sealing agent becomes excessively high and the uniform application of the sealing agent to the seal portion becomes difficult.

The number average molecular weight is determined, for example, by a measurement with the VPO (vapor pressure osmometer). The kinematic viscosity at 40° C. is determined, for example, by the method specified in JIS K2283.

The polybutene used in the above is a hydrocarbon compound having a long-chain molecular structure obtained by a polymerization of mainly isobutene and partially normal butene, and is a nonpoisonous, no-impurity, transparent liquid polymer which is very stable under normal conditions.

For excellent application performance, the mixing weight ratio of the hot-melt resin to polybutene in the sealing agent is preferably 20 to 60:80 to 40.

The softening point of the above sealing agent is lower than the softening point of the hot-melt resin itself, and the sealing agent is applied to a predetermined position of the battery case, while keeping the temperature slightly higher (for example, 70° C. to 110° C.) than the softening point of the sealing agent (for example, 60° C. to 100° C.).

As described above, since the temperature of the sealing agent is kept high during its application, when left for a long time, the sealing agent is easily deteriorated by oxidation from heat and changes its quality. For preventing such, the sealing agent preferably further contains 0.001 to 0.5 wt % of an antioxidant. For the antioxidant, for example, a hindered phenol antioxidant is used. With an antioxidant content of below 0.001 wt %, the effects of the antioxidant are insufficient. With the antioxidant content exceeding 0.5 wt %, even though the antioxidant is further added, the effects are unchanged from the case when the content is 0.5 wt %.

The sealing agent preferably further contains 0.001 to 5 wt % of a coloring agent. For the coloring agent, for example, oil red and carbon black are used.

With the coloring agent content of below 0.001 wt %, the sealing agent is not sufficiently colored. When the coloring agent content exceeds 5 wt %, even though the coloring agent is further added, the accuracy in determining the application conditions of the sealing agent in the manufacturing steps does not change from the case when the content is 5 wt %.

For the positive electrode, a positive electrode material mixture comprising a mixture of the following, for example, is used: a positive electrode active material of at least one of manganese dioxide and nickel oxyhydroxide, a conductive material such as graphite, and an alkaline electrolyte such as an aqueous solution of potassium hydroxide.

For the negative electrode, a gelled negative electrode comprising a mixture of the following, for example, is used: a negative electrode active material of zinc, a gelling agent such as sodium polyacrylate, and an alkaline electrolyte such as an aqueous solution of potassium hydroxide.

For the separator, for example, a nonwoven fabric obtained by mixing mainly polyvinyl alcohol fiber and rayon fiber is used.

EXAMPLE

In the following, Examples of the present invention are described in detail, but the present invention is not limited to these Examples.
(1) Positive Electrode Material Mixture Preparation Manganese dioxide powder (average particle size: 35 μm) was mixed with graphite powder (average particle size: 15 μm) in a weight ratio of 90:10. The mixture was blended with 40% by weight of aqueous potassium hydroxide solution, as an alkaline electrolyte, in a weight ratio of 100:3; stirred sufficiently; and then compression molded into flakes. Then, the flake positive electrode material mixture was crushed into granules, and the granules were classified with a sieve. The granules of 10 to 100 mesh size were pressure-molded into a hollow cylindrical shape, to obtain positive electrode material mixture pellets.
(2) Gelled Negative Electrode Preparation Sodium polyacrylate as a gelling agent was mixed with 40% by weight of aqueous potassium hydroxide solution as an alkaline electrolyte and zinc powder (average particle size: 200 μm) as a negative electrode active material in a weight ratio of 1:33:66, to obtain a gelled negative electrode.
(3) Cylindrical Alkaline Primary Battery Assembly A D-size alkaline primary battery having a structure as shown in FIG. 1 (LR20) was prepared with the procedures below. FIG. 1 is a front view of a cylindrical alkaline primary battery, with a partial cross section.

Two pellets of positive electrode material mixture 2 obtained in the above were inserted into a battery case 1, and pellets of positive electrode material mixture 2 were re-molded with a compression jig to be brought into close contact with the inner wall of the battery case 1. At the center of pellets of positive electrode material mixture 2 which were brought into close contact with the inner wall of the battery case 1, a bottomed cylindrical separator 4 was disposed. Into the separator 4, a predetermined amount of 40% by weight of aqueous potassium hydroxide solution was injected as an alkaline electrolyte. After an elapse of a predetermined time period, a gelled negative electrode 3 obtained in the above was charged in the separator 4. For the separator 4, a nonwoven fabric obtained by mixing polyvinyl alcohol fiber and rayon fiber was used.

A negative electrode current collector 5 was inserted into the center of the gelled negative electrode 3. The negative electrode current collector 5 was integrated in advance with a gasket 8, having a central cylindrical portion 9 provided with a hole for inserting the negative electrode current collector 5; and a bottom plate (sealing plate) 6 also functioning as a negative electrode terminal; and an insulating washer 7. The gasket 8 is provided with a thin-wall portion 10. When the amount of gas generation becomes large and the battery internal pressure is increased significantly, the thin-wall portion 10 breaks to discharge gas to the outside. Then, the opening end of the battery case 1 was crimped to the peripheral portion of the bottom plate 6 with the end of the gasket 8 interposed therebetween, to seal the opening of the battery case 1. The outer surface of the battery case 1 was covered with an outer label (not shown).

EXAMPLES 1 TO 6

In the above-described fabrication of alkaline primary batteries, a sealing agent was applied to a seal portion of the battery case 1 (a portion in close contact with the gasket 8) with a hot-melt applicator, to place the gasket 8 at the opening portion of the battery case 1, thereby forming a coating layer of the sealing agent between the battery case 1 and the gasket 8 to provide a seal between the battery case 1 and the gasket 8. The amount of the sealing agent applied at this time was 40 mg.

For the sealing agent, a hot-melt resin and polybutene mixed in a weight ratio of 30:70 was used. When mixing, polybutene was heated to give a temperature above the softening point of the hot-melt resin, and the hot-melt resin was added to the heated polybutene in small portions while stirring.

For the hot-melt resin, products of various grades of Nisseki Neopolymer manufactured by Nippon Oil Corporation were used. Table 1 shows a weight average molecular weight and a softening point of respective hot-melt resins.

For the polybutene, Nisseki polybutene LV-100 (a number average molecular weight of 500 and a kinematic viscosity at 40° C. of 205 $mm^2/S$) manufactured by Nippon Oil Corporation was used.

TABLE 1

|  | Hot-melt Resin | | | | |
|---|---|---|---|---|---|
|  | Softening Point (° C.) | Weight Average Molecular Weight | Leakage-Resistance | Application Performance A | Application Performance B |
| Comp. Ex. 2 | 90 | 800 | ◯ | Δ | Δ |
| Ex. 1 | 95 | 1100 | ◎ | ◎ | ◯ |
| Ex. 2 | 120 | 1500 | ◎ | ◎ | ◎ |
| Ex. 3 | 130 | 1800 | ◎ | ◎ | ◎ |
| Ex. 4 | 145 | 2100 | ◎ | ◎ | ◎ |
| Ex. 5 | 155 | 2600 | ◎ | ◎ | ◎ |
| Ex. 6 | 160 | 3000 | ◎ | ◎ | ◎ |
| Comp. Ex. 1 | — | — | ◎ | ◯ | Δ |

COMPARATIVE EXAMPLE 1

Alkaline primary batteries were made in the same manner as Example 1, except that for the sealing agent, a mixture of asphalt, polybutene, and xylene (a weight ratio of 44:13:43) (APX 23 manufactured by Uchida Kakoh Co., Ltd.) was used.

[Evaluation]

The batteries of Examples 1 to 6 and Comparative Examples 1 to 2 were made, 60 batteries for respective Examples, and the evaluations as described below were carried out.

(A) Leakage-Resistance

The batteries were allowed to stand for two months under an environment with a temperature of 60° C. and 90% humidity. The batteries were visually checked after the two months to see if there was a leakage, and the number of the batteries in which leakage occurred was determined.

(B) Application Performance A of Sealing Agent

The number of the batteries in which the sealing agent flowed out from between the battery case and the gasket was determined immediately after the battery fabrication.

(C) Application Performance B of Sealing Agent

After allowing to stand for 12 hours at −20° C., the batteries were allowed to stand for 12 hours at 80° C., to give rapid temperature changes. After repeating such for one month, the number of the batteries in which the sealing agent flowed out from between the battery case and the gasket was checked.

The results of the evaluations above are shown in Table 1. Under the "leakage-resistance" column in Table 1, ⊚, ◯, Δ, and x show the leakage occurrence rate of 0%, over 0% to 20% or less, over 20% to 50% or less, and over 50%, respectively. Under the columns of application performance A and B in Table 1, ⊚, ◯, Δ, and x show the sealing agent flowing-out occurrence rate of 0%, over 0% to 20% or less, over 20% to 50% or less, and over 50%, respectively.

The batteries of Examples 1 to 6 achieved excellent leakage-resistance, and the conditions of the coating of the sealing agent were excellent, compared with the batteries of Comparative Example 1. The batteries of Comparative Example 2 using the hot-melt resin with a softening point of below 95° C. had no problem in leakage-resistance, but showed tendency to decline application performance. In Examples 2 to 6, the conditions of the coating of the sealing agent were excellent in all of the batteries.

EXAMPLES 7 TO 10, AND COMPARATIVE EXAMPLE 3

For the polybutene, various grades of Nisseki polybutene manufactured by Nippon Oil Corporation were used, singly or in combination. Table 2 shows a number average molecular weight and a kinematic viscosity at 40° C. of respective polybutene.

For the hot-melt resin, the hot-melt resin used in Example 3 was used (a weight average molecular weight of 1800 and a softening point of 130° C.). Other than that, alkaline primary batteries were made in the same manner as Example 1, and the evaluations were carried out. The evaluation results are shown in Table 2.

TABLE 2

| | Polybutene | | | | |
| | Number Average Molecular Weight | Kinematic Viscosity at 40° C. (mm²/s) | Leakage-Resistance | Application Performance A | Application Performance B |
|---|---|---|---|---|---|
| Ex. 7 | 300 | 10 | ◯ | ◯ | ◯ |
| Ex. 8 | 430 | 110 | ⊚ | ⊚ | ⊚ |
| Ex. 9 | 500 | 205 | ⊚ | ⊚ | ⊚ |

TABLE 2-continued

| | Polybutene | | | | |
| | Number Average Molecular Weight | Kinematic Viscosity at 40° C. (mm²/s) | Leakage-Resistance | Application Performance A | Application Performance B |
|---|---|---|---|---|---|
| Ex. 10 | 700 | 1000 | ⊚ | ⊚ | ⊚ |
| Comp. Ex. 3 | 800 | 2300 | ⊚ | Application Failure | ◯ |
| Comp. Ex. 1 | — | — | ⊚ | ◯ | Δ |

The batteries of Examples 7 to 10 achieved excellent leakage-resistance, and the conditions of the coating of the sealing agent were excellent compared with the batteries of Comparative Examples 1 and 3. Especially in Examples 8 to 10, all batteries show the excellent conditions of the coating of the sealing agent. "Application Failure" noted in Table 2 means that the sealing agent did not coat the entire application portion when the sealing agent was applied at a predetermined position.

EXAMPLES 11 TO 17

In preparing the sealing agent, the amounts of the hot-melt resin and the polybutene to be blended were changed to the values shown in Table 3. For the hot-melt resin, the hot-melt resin used in Example 3 (a weight average molecular weight of 1800 and a softening point of 130° C.) was used. For the polybutene, the polybutene used in Example 9 (a number average molecular weight of 500 and a kinematic viscosity at 40° C. of 205 mm²/S) was used.

Except for the above, alkaline primary batteries were made in the same manner as Example 1, and the evaluations were carried out. The evaluation results are shown in Table 3.

TABLE 3

| | Sealing Agent | | | Application | Application |
| | Hot-melt Resin | Poly-butene | Leakage-Resistance | Performance A | Performance B |
|---|---|---|---|---|---|
| Ex. 11 | 10 | 90 | ◯ | X | Δ |
| Ex. 12 | 20 | 80 | ⊚ | ⊚ | ◯ |
| Ex. 13 | 30 | 70 | ⊚ | ⊚ | ⊚ |
| Ex. 14 | 40 | 60 | ⊚ | ⊚ | ⊚ |
| Ex. 15 | 50 | 50 | ⊚ | ⊚ | ⊚ |
| Ex. 16 | 60 | 40 | ⊚ | ⊚ | ⊚ |
| Ex. 17 | 70 | 30 | ◯ | Application Failure | ⊚ |
| Comp. Ex. 1 | — | — | ⊚ | ◯ | Δ |

The batteries of Examples 12 to 16 achieved excellent leakage-resistance compared with the batteries of Comparative Example 1 and of Examples 11 and 17, and the conditions of the coating of the sealing agent were excellent. This showed that the mixing weight ratio of the hot-melt resin to the polybutene in the sealing agent was preferably 20 to to 40. Especially in Examples 13 to 16, the conditions of the coating of the sealing agent were excellent in all batteries.

EXAMPLES 18 TO 23

Alkaline primary batteries were made in the same manner as Example 13, except that in preparing the sealing agent, Oil Red 5B manufactured by Orient Chemical Industries was added to the sealing agent of Example 3 as the coloring agent, in various ratios shown in Table 4. Then, by using a sensor for detecting the coloring agent in the sealing agent, the detection was carried out ten times, and the number detected was determined.

Table 4 shows the result. In Table 4, x in "detection degree" column indicates the detection rate of 50% or less, and ⊚ indicates the detection rate of 100%.

TABLE 4

|  | Amount of Coloring Agent Added (wt %) | Detection Degree |
|---|---|---|
| Ex. 18 | 0.0005 | X |
| Ex. 19 | 0.001 | ⊚ |
| Ex. 20 | 0.01 | ⊚ |
| Ex. 21 | 0.1 | ⊚ |
| Ex. 22 | 1 | ⊚ |
| Ex. 23 | 5 | ⊚ |

It was clarified that when the sealing agent contained 0.001 wt % or more of the coloring agent, the conditions of the coating can be reliably detected by the coloring agent.

EXAMPLES 24 TO 28

In the preparation of the sealing agent, IRGANOX 1010 manufactured by Chiba Specialty Chemicals was added to the sealing agent of Example 3 as an antioxidant, with the ratios shown in Table 5. At one day and twenty days after the preparation of the sealing agent, alkaline primary batteries were made in the same manner as Example 13.

Two hundred batteries were made for respective Examples, and the number of the batteries in which application failure occurred was determined. The results are shown in Table 5. In Table 5, ⊚ under the "application performance" column indicates the application failure occurrence of 0%, and ○ indicates the application failure occurrence of below 20%.

TABLE 5

|  | Amount of Antioxidant Added (wt %) | Application Performance | |
|---|---|---|---|
|  |  | After One Day | After 20 Days |
| Ex. 24 | 0 | ⊚ | ○ |
| Ex. 25 | 0.001 | ⊚ | ⊚ |
| Ex. 26 | 0.01 | ⊚ | ⊚ |
| Ex. 27 | 0.1 | ⊚ | ⊚ |
| Ex. 28 | 0.5 | ⊚ | ⊚ |

It was clarified that when the 0.001 wt % or more of the antioxidant was included in the sealing agent, the effects of the antioxidant were obtained sufficiently and the conditions of the coating of the sealing agent were excellent, both after one day and after twenty days.

Industrial Applicability

As described above, the alkaline primary battery of the present invention is excellent in leakage-resistance, and therefore is suitably used for a power source for electronic devices and portable devices.

The invention claimed is:

1. An alkaline primary battery comprising:
a positive electrode containing at least one of manganese dioxide and nickel oxyhydroxide;
a negative electrode containing zinc;
a separator disposed between said positive electrode and said negative electrode;
an alkaline electrolyte;
a battery case for housing said positive electrode, said negative electrode, said separator, and said alkaline electrolyte;
a sealing plate for sealing an opening portion of said battery case;
a resin-made gasket disposed between said battery case and said sealing plate; and
a negative electrode current collector inserted in said negative electrode and said gasket, wherein
said battery case is electrically connected to said positive electrode,
said sealing plate is electrically connected to said negative electrode,
a sealing agent is disposed between an inner surface of said battery case and said gasket,
said sealing agent comprises a mixture of a hot-melt resin with a weight average molecular weight of 1000 to 3000 and a softening point of 95 to 160° C., and polybutene with a number average molecular weight of 300 to 700 and a kinematic viscosity at 40° C. of 10 to 1000 mm$^2$/S, and
a mixing weight ratio of said hot-melt resin to said polybutene in said sealing agent is 20:80 to 60:40.

2. The alkaline primary battery in accordance with claim 1, wherein said hot-melt resin comprises a copolymer of vinyltoluene and indene.

3. The alkaline primary battery in accordance with claim 1, wherein a mixing weight ratio of said hot-melt resin to said polybutene in said sealing agent is 30:70 to 60:40.

4. The alkaline primary battery in accordance with claim 1, wherein said sealing agent further includes 0.001 to 5 wt % of a coloring agent.

5. The alkaline primary battery in accordance with claim 1, wherein said sealing agent further includes 0.001 to 0.5 wt % of an antioxidant.

6. An alkaline primary battery comprising:
a positive electrode containing at least one of manganese dioxide and nickel oxyhydroxide;
a negative electrode containing zinc;
a separator disposed between said positive electrode and said negative electrode;
an alkaline electrolyte;
a battery case for housing said positive electrode, said negative electrode, said separator, and said alkaline electrolyte, said battery case having an opening portion;
a sealing plate for sealing the opening portion of said battery case;
a resin-made gasket disposed between said battery case and said sealing plate; and
a negative electrode current collector inserted in said negative electrode and said gasket, wherein
said battery case is electrically connected to said positive electrode,
said sealing plate is electrically connected to said negative electrode,
an opening end portion of said battery case is crimped to a peripheral portion of said sealing plate with said gasket interposed therebetween, to seal the opening portion of said battery case,
a sealing agent is disposed between said gasket and an inner surface of the crimped portion of said battery case,
said sealing agent comprises a mixture of a hot-melt resin with a weight average molecular weight of 1000 to 3000 and a softening point of 95 to 160° C., and polybutene with a number average molecular weight of 300 to 700 and a kinematic viscosity at 40° C. of 10 to 1000 mm$^2$/S, and
a mixing weight ratio of said hot-melt resin to said polybutene in said sealing agent is 20:80 to 60:40.

* * * * *